April 12, 1955     W. J. KOCH     2,706,124
SHAFT SEAL
Filed Jan. 11, 1954
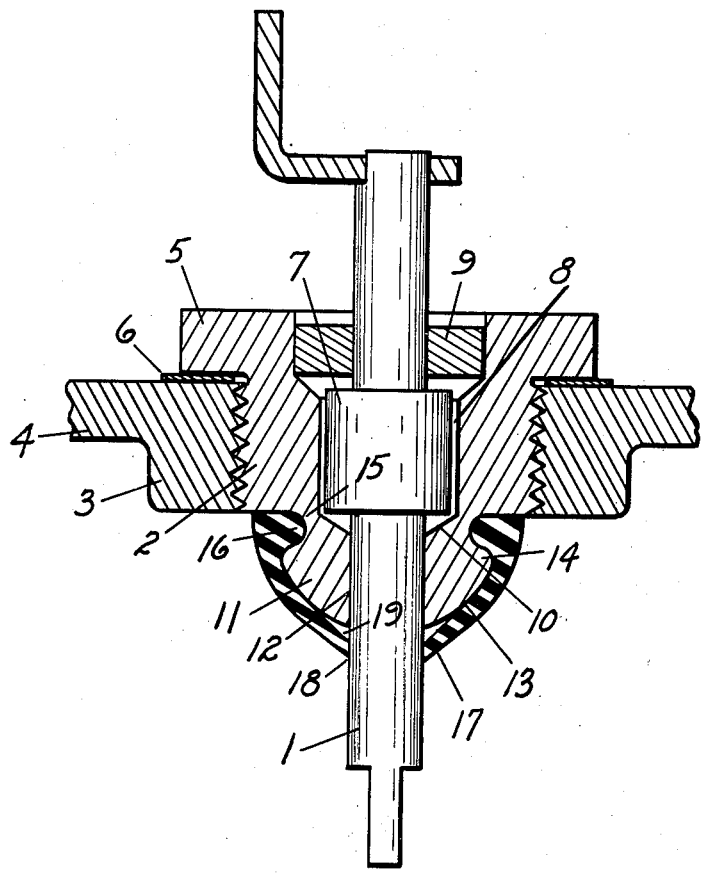
INVENTOR
William J. Koch
BY Ralph Hammar
ATTORNEY

United States Patent Office 2,706,124
Patented Apr. 12, 1955

2,706,124

SHAFT SEAL

William J. Koch, Erie, Pa., assignor to American Meter Company, Incorporated, Erie, Pa., a corporation of Delaware Application January 11, 1954, Serial No. 403,240

3 Claims. (Cl. 286—5)

This invention is a fluid pressure shaft seal which will operate at all pressures from zero to 100 or more pounds per square inch. One use for such seals is in gas meters for the shaft connecting the meter operating mechanism to the register or counter. In a preferred form, the shaft extends through the center of a mushroom head carrying a hollow thin-walled conical rubber sealing member whose walls normally engage the outer part of the mushroom head and flare away from the mushroom head toward the center with progressively increasing divergence. The shaft extends through the apex of the sealing member and at low pressures is gripped by the inherent resilience of the sealing member with sufficient pressure to effect a seal. At higher pressures the walls of the sealing member collapse against the mushroom head progressively from the outer part toward the center so the pressure supplements the inherent resilience of the sealing member in making a seal to the shaft.

In the drawing, the single figure is a longitudinal section through a shaft seal.

In the drawing, the shaft seal is shown applied to the shaft 1 which connects the measuring mechanism of a gas meter to the register or counter. Because gas pressures may vary from a few inches water to 100 or more pounds per square inch, it is desirable that the seal for the shaft 1 be effective throughout this entire pressure range so that there will be no problem of changing meter seals if for any reason the gas pressure is changed.

The shaft 1 and its seal are shown mounted on a fitting 2 threaded in a boss 3 in a wall 4 of the gas meter housing. The fitting has a head 5 provided with the usual wrench surface and a washer 6 is arranged between the head and the adjacent surface of the wall 4.

The shaft 1 has at its center an enlargement 7 which is loosely retained in a bore 8 in the fitting by a washer 9 suitably secured to the fitting. There is sufficient clearance between the washer 9 and the bottom 10 of the bore 8 to allow for the necessary end play of the shaft 1. When the washer 9 is secured in place, the shaft is assembled and held in the fitting.

On the inner or high pressure end of the fitting 2 is a mushroom head 11 having a bore 12 through which the shaft 1 extends. The outer surface 13 of the head 11 is generally spherical. Between the outer periphery 14 of the head and in the adjacent portion of the fitting 2 is a groove 15 in which is snapped an internal annular rib 16 of a dome-shaped sealing member 17 made of rubber or other elastomeric material, natural or synthetic. The dome-shaped sealing member has at its center or apex an aperture 18 of sufficiently smaller diameter than the outside diameter of the shaft 1 so that in the absence of any pressure on the outside of the sealing member 17, a seal is effected by the inherent resilience of the sealing member.

The inherent resilience of the sealing member is sufficient to make a fluid tight seal under low gas pressures but is not sufficient for high gas pressures, and it is desirable to extend the useful range of the shaft seal to higher pressures. This is accomplished by making the inner surface 19 of the sealing member 17 of generally conical shape so that when the outer part of the sealing member 17 is snapped over the edge of the head and held there by the engagement of the rib 16 in the groove 15, only the outer part of the inner surface 19 of the sealing member 17 contacts the outer surface 13 of the head 11. In the absence of any gas pressure acting on the sealing member 17, the inner surface 19 of the sealing member will normally contact only the outer part of the spherical outer surface 13 of the backing member or mushroom head 11 and will be spaced from the outer surface of the backing member at the center as illustrated in the drawing. Because the inner surface 19 of the sealing member is conical, it flares away from the outer surface of the backing member toward the center with increasing divergence so that as the fluid pressure acting on the outside of the sealing member 17 increases, the sealing member progressively collapses into contact with the backing member or head 11 toward the center. From one aspect, this progressive collapse under increased pressure decreases the unsupported span of the sealing member 17 around the aperture 18 so that with higher pressures the shorter span is effective without a buckling which would tend to destroy the seal. The increasing divergence between the inner surface 19 of the sealing member 17 and the outer surface 13 of the backing member 11 is conveniently obtained by making the surface 13 spherical and the surface 17 conical. If the surface 13 were other than spherical, the same effect could be obtained by making corresponding changes in the inner surface 19. By reason of the divergence between the outer surface 13 of the backing member 11 and the inner surface of the sealing member 17, the sealing engagement with the shaft 1 is effective throughout a range of gas pressures from zero to 100 or more pounds per square inch.

What is claimed as new is:

1. In a fluid pressure shaft seal, a mushroom head having an axial shaft receiving bore at the center of the head, a hollow thin wall dome-shaped shaft sealing member of elastomeric material having its outer rim snapped over the peripheral edge of the head and having at the center of the dome an aperture concentric with said bore and sufficiently smaller than the shaft to grip the same and effect a seal by the inherent resilience of the sealing member, the inner surface of the sealing member engaging the outer surface of the head at the periphery of the head and being normally spaced out of contact with the head at the center, and said inner surface of the sealing member flaring away from the outer surface of the head toward the center with increasing divergence whereby under increasing fluid pressure the sealing member progressively collapses into contact with the head toward the center.

2. In a fluid pressure shaft seal, a hollow thin walled dome-shaped sealing member of elastomeric material having at its center a shaft receiving aperture sufficiently smaller than the shaft to grip the same and effect a seal by the inherent resilience of the sealing member, a backing member having an outer surface projecting into the sealing member and having therein a shaft receiving bore concentric with said aperture, the inner surface of the sealing member engaging the outer surface of the backing member at the outer part and being normally spaced out of contact with the outer surface of the backing member at the center, and said inner surface of the sealing member flaring away from the outer surface of the backing member toward the center with increasing divergence whereby under increasing fluid pressure the sealing member progressively collapses into contact with the head toward the center.

3. The seal of claim 2 in which the sealing member is conical and the backing member has an outer spherical surface projecting into the sealing member and normally engaging the inner surface of the sealing member at the outer part of the cone.

References Cited in the file of this patent

UNITED STATES PATENTS

| | | |
|---|---|---|
| 1,603,556 | Platt et al. | Oct. 19, 1926 |
| 2,321,250 | Russell | June 8, 1943 |